United States Patent [19]

Wyland

[11] Patent Number: 5,997,174
[45] Date of Patent: Dec. 7, 1999

[54] METHOD FOR DETERMINING A THERMAL PARAMETER OF A DEVICE BY MEASURING THERMAL RESISTANCE OF A SUBSTRATE CARRYING THE DEVICE

[75] Inventor: Christopher P. Wyland, Santa Clara, Calif.

[73] Assignee: Integrated Device Technology, Inc., Santa Clara, Calif.

[21] Appl. No.: 08/897,859

[22] Filed: Jul. 21, 1997

Related U.S. Application Data

[62] Division of application No. 08/651,224, May 22, 1996.
[51] Int. Cl.$^6$ .............................. G01N 25/20; G01K 7/00
[52] U.S. Cl. ............................. 374/43; 374/164; 374/141
[58] Field of Search ................................ 374/164, 43, 44, 374/141

[56] References Cited

U.S. PATENT DOCUMENTS

| | | | |
|---|---|---|---|
| 3,592,060 | 7/1971 | Laverman | 374/43 |
| 3,733,887 | 5/1973 | Stanley et al. | 374/44 |
| 3,926,052 | 12/1975 | Bechtel | 374/20 |
| 4,498,789 | 2/1985 | Kiss et al. | 374/164 |
| 4,614,721 | 9/1986 | Goldberg | 374/37 |
| 4,639,883 | 1/1987 | Michaelis | 374/182 |
| 4,840,495 | 6/1989 | Bonnefoy | 374/43 |
| 4,946,288 | 8/1990 | Siska et al. | 374/20 |
| 5,040,381 | 8/1991 | Hazen | 62/3.2 |
| 5,088,833 | 2/1992 | Tsang et al. | 374/17 |
| 5,090,817 | 2/1992 | Ker et al. | 374/16 |
| 5,318,361 | 6/1994 | Chase et al. | 374/57 |
| 5,544,487 | 8/1996 | Attey et al. | 62/3.3 |
| 5,620,253 | 4/1997 | Graebner et al. | 374/43 |

FOREIGN PATENT DOCUMENTS

| | | | |
|---|---|---|---|
| 2592-490 | 7/1987 | France | 374/43 |
| 0741-126 | 6/1980 | U.S.S.R. | 374/43 |
| 0958-937 | 9/1982 | U.S.S.R. | 374/43 |

OTHER PUBLICATIONS

"Method 1012.1 Thermal Characteristics", MIL–STD–883C, Nov. 4, 1980, (Revised Aug. 15, 1984), 7 pgs.

Example of DELPHI Process: A Plastic Quad Flat Pack (PQFP), DELPHI—Development of Libraries of Physical Models for an Integrated Design Environment, 1995, 1 pg.

"Thermal Characterication of Electronic Packages—Standardization Activities Status", Frank F. Oettinger, National Institute of Standards and Technology, EIA JEDEC JC–15 Committee on Electrical and Thermal Characterization of Semiconductor Packages and Interconnects, Sep. 26, 1991.

(List continued on next page.)

*Primary Examiner*—Diego Gutierrez
*Assistant Examiner*—Quyen Doan
*Attorney, Agent, or Firm*—Skjerven, Morrill, MacPherson, Franklin & Friel

[57] ABSTRACT

The junction temperature of a die inside an electronic component is empirically determined by use of a board simulator that simulates a target board on which the electronic component is to be operated. The board simulator's thermal resistivity is determined in a first calibration step by measuring the difference in temperatures between two thermocouples mounted on two sides of the board simulator. Then, the board simulator is attached to a test component that includes a heating element and a temperature sensor. In a second calibration step, for a known thermal power generated by the heating element, the junction temperature of the test component is measured for different values of thermal resistivity of the board simulator. Next in a measurement step, the user determines the thermal resistivity of the target board. Then the user uses the measured resistivity to look up the junction temperature of the test component from the calibration measurements, which is the estimated junction temperature of the electronic component.

17 Claims, 11 Drawing Sheets

OTHER PUBLICATIONS

"EIA/JESD51–2 Integrated Circuits Thermal Test Method Environmental Conditions—Natural Convection (Still Air)", Electronics Industries Association, Dec. 19, 1995.

"EIA/JESD51–1 Integrated Circuit Thermal Measurement Method—Electrical Test Method (Single Semiconductor Device)", Electronics Industries Association, Dec. 19, 1995.

"EIA/JESD51 Methodology for the Thermal Measurement of Component Packages (Single Semiconductor Device)", Electronics Industries Association, Dec. 19, 1995.

"Fast Measurement of the Peak Junction Temperature of Power Transistors Using Electrical Method", Lu, C.Z., et al., Feb., 12–14, 1991; 1991 Proc. 7th Annual IEEE Semiconductor Thermal Measurement and Management Symp., pp. 39–43.

"Experimental Thermal Characterization of VLSI Packages", Shope, D.A., et al., Feb. 10–12, 1988; 4th Annual IEEE Semiconductor Thermal and Temperature Measurement Symposium, pp. 19–24.

"Thermal Studies of a Plastic Dual–in–Line Package", Mithcell, C., et al., Dec. 1979; IEEE Transactions on Components, Hybrids, and Manufacturing Technology, pp. 500–511.

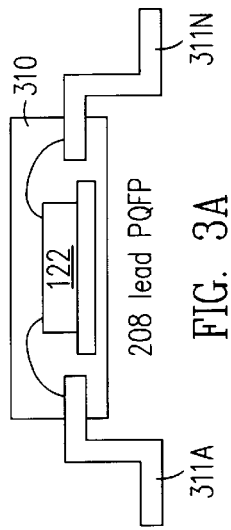
FIG. 3A  208 lead PQFP
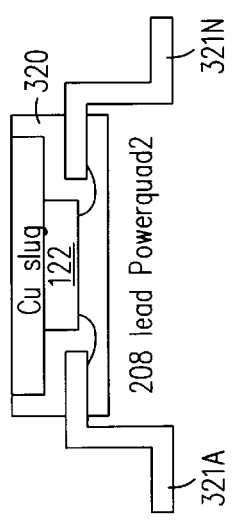
FIG. 3B  208 lead Powerquad2
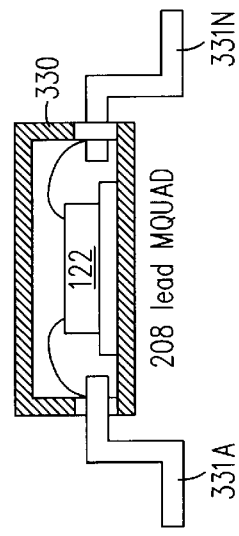
FIG. 3C  208 lead MQUAD
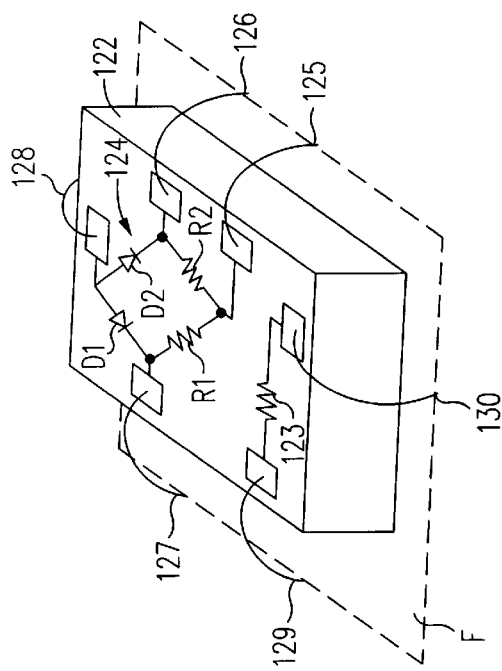
FIG. 2
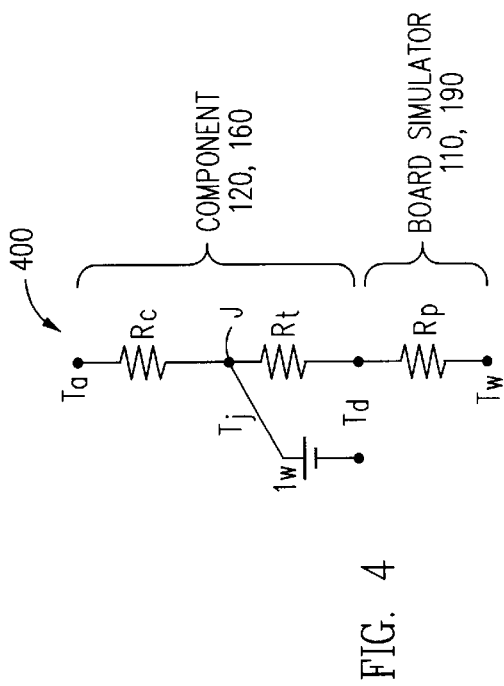
FIG. 4

METHOD FOR DETERMINING A THERMAL PARAMETER OF A DEVICE BY MEASURING THERMAL RESISTANCE OF A SUBSTRATE CARRYING THE DEVICE

This application is a division of application Ser. No. 08/651,224, filed May 22, 1996.

FIELD OF THE INVENTION

This invention relates to an apparatus and method for determining the temperature of a junction of a semiconductor die in an electronic component by measuring the temperature rise of a board on which the component is mounted, and using the board's temperature rise to determine the junction temperature.

BACKGROUND OF THE INVENTION

The amount of energy transmitted by an electronic component into a board on which the component is mounted depends on a number of factors including, for example, the materials used in the component's package, construction of the package, materials used in the board, and construction of the board. Similarly, the energy transmitted by the component into air adjacent to the component is also a function of a number of variables, such as the air's velocity and the construction of the component's package. Calculation of the amount of energy transmitted by a component into the air and into the board is extremely complex and time consuming.

However, such calculation is helpful to determine the performance of the component in a system. One parameter useful in calculating the destination of the energy emitted from a package is the thermal resistivity of the package. The thermal resistivity of an electronic component's package is typically measured with the package mounted on a board, the board having either ground and power planes, or only conductive traces on the top and bottom side of the board. The thermal resistivity can also be measured with the package suspended inside a box.

SUMMARY OF THE INVENTION

A board simulator in accordance with the invention is used to simulate a board (henceforth a "target board") on which an electronic component is to be operated, and to thereby estimate the energy transferred by the electronic component and the junction temperature of a semiconductor die inside the electronic component. The board simulator includes a thermoelectric cooler (such as a peltier device), a first thermally conductive substrate coupled to a first side of the thermoelectric cooler and a heatsink coupled to a second side opposite the first side. The thermoelectric cooler regulates the amount of heat transferred from the first side to the second side of the thermoelectric cooler, in dependence on electric power (also called "peltier power" or "bias power") supplied to the thermoelectric cooler. The first thermally conductive substrate acts as an isothermal cold plate that ensures uniform temperature across the first side of the thermoelectric cooler. The heatsink transfers heat away from the second side of the thermoelectric cooler into an ambient fluid (such as air, or water) that surrounds the heatsink. A second thermally conductive substrate can be optionally included in the board simulator, sandwiched between the second side and the heatsink.

A test component (described below) similar (in one case identical) to the electronic component can be mounted directly on the first thermally conductive substrate, if the first thermally conductive substrate has substantially the same area as the footprint of the electronic component. Alternatively, the test component can be mounted on an optional part called a "coupon" that is included in the heatflow controller and that is thermally coupled by the first thermally conductive substrate to the thermoelectric cooler first side. The coupon can be formed of any material (such as a plastic core of a printed circuit board, copper or aluminum), has known dimensions (e.g. width, thickness and length), and preferably has a known thermal conductivity (to estimate the amount of heat passing through the material for a given temperature drop across the material). In one embodiment, the coupon has the same area as the footprint of the electronic component to be operated on the target board. However, the coupon can have an area larger than the footprint, as long as the area outside the footprint is insulated.

A board simulator in accordance with this invention includes insulation that is wrapped around the optional coupon if present, and around the first thermally conductive substrate and the thermoelectric cooler. The insulation ensures that all heat received from terminals (e.g. leads) of the electronic component is transferred through the optional coupon if present, the first thermally conductive substrate, the thermoelectric cooler and thereafter through the heatsink into the ambient fluid.

A board simulator as described herein allows measurement of a junction temperature of a test component mounted on the board simulator. The board simulator acts as a thermal equivalent of the target board, and therefore allows the junction temperature of an electronic component mounted on the target board to be determined empirically, from the junction temperature of the test component.

Also, the board simulator can be used to measure thermal resistivity of a target board. In this context, thermal resistivity of any two points is the difference in temperatures between the two points divided by the thermal power passing between the two points. The board simulator includes a first temperature sensor and a second temperature sensor, to determine the respective temperatures on the first side and second side of the thermoelectric cooler. The second temperature sensor can be directly coupled to the second side of the thermoelectric cooler, or alternatively the second temperature sensor can be suspended in the ambient fluid.

In a first calibration step of the invention, the thermal resistivity of the board simulator is determined from the difference in temperatures of the two temperature sensors and a known amount of thermal power generated in a test component mounted on the board simulator. If the determined thermal resistivity is higher than that of a target board, the thermoelectric cooler is operated to cool the board simulator. Alternatively, if the thermal resistivity is lower than that of a target board the thermoelectric cooler is reverse biased and operated to act as a heater to increase the thermal resistance of the board simulator. So the first calibration step is used to measure the board simulator's thermal resistivities for different amounts of power (also called "bias power" or "peltier power") supplied to the thermoelectric cooler.

A test component that is attached to a board simulator is substantially similar to the electronic component that is mounted on the target board. The test component includes a heating element to generate thermal power equal to the thermal power known to be generated during operation of the electronic component. The test component has a package and terminals that are respectively identical to the package and terminals of the electronic component. The test component also has a temperature sensor to measure the temperature (hereinafter "junction" temperature) adjacent to the heating element.

The heating element and the temperature sensor can be formed adjacent to each other in a single integrated circuit die (hereinafter, "thermal die") included in the test component. If the electronic component is to be attached directly to a target board (e.g. by a flip chip method), the test component is also directly attached (e.g. by the same flip chip method) to the board simulator.

During a second calibration step, while the known amount of thermal power is generated by the heating element, the junction temperature is measured at the temperature sensor, for different values of the board simulator's thermal resistivity and different values of the bias power. The measurements in the two calibration steps described above can be used to empirically determine the junction temperature of an electronic component operated on the target board.

Specifically, a user, knowing the thermal resistivity of a target board can look up the board simulator measurements (in table form, in graph form or in a formula) of the first calibration step to empirically determine the bias power needed by the board simulator to mimic the target board. Then the user can use the determined bias power to determine the junction temperature of the test component from the board simulator measurements of the second calibration step. The test component's junction temperature empirically estimates the electronic component's junction temperature, according to the principles of this invention, and is used, e.g. by a system designer as described below.

The user can determine the target board's thermal resistivity in a number of ways. In one embodiment, the user attaches a test component to the target board to generate the known thermal power and thereby mimic conditions during operation of the electronic component on the target board. In an alternative embodiment, the user attaches a heater wire and a first thermocouple adjacent to each other on one side of the target board, suspends a second thermocouple in ambient air and measures the difference in temperatures of the two thermocouples while generating a known amount of thermal power in the heater wire. In the alternative embodiment, the rise in temperature of a target board at a known distance from the first thermocouple (for example, to mimic a neighbor electronic component) can be determined by mounting and operating a second heater wire at the known distance.

A board simulator as described herein provides an easy way to empirically determine the junction temperature as well as the amount of thermal power conducted through the terminals (such as leads) of the electronic component. Use of a board simulator eliminates bulky plumbing needed to measure the actual temperature rise in a prior art water cooled cold plate. Electrically controlling the heat passing through a thermoelectric cooler as described herein is easier and eliminates the prior art steps of measuring fluid flow and computing the amount of power dissipated by the fluid flow, with the inaccuracies inherent in such measurements and computations.

Also, for a given application, a system designer can pick a target board having a thermal resistivity low enough to meet a predetermined maximum junction temperature, e.g. a target board which dissipates a predetermined minimum power to be generated by operation of the electronic component. Also, heat loss from an electronic component into air surrounding the component can be determined as the difference between a known thermal power generated by the component and an empirically determined thermal power transferred to the target board.

BRIEF DESCRIPTIONS OF THE DRAWINGS

FIG. 2 illustrates a thermal die on which are formed a heating element and a temperature sensor.

FIGS. 3A–3C illustrate three packages that enclose the thermal die of FIG. 2 in three variants of one embodiment.

FIG. 4 illustrates a model of thermal resistivities for the apparatuses of FIGS. 1A–1B.

DETAILED DESCRIPTION

Figure 1A:
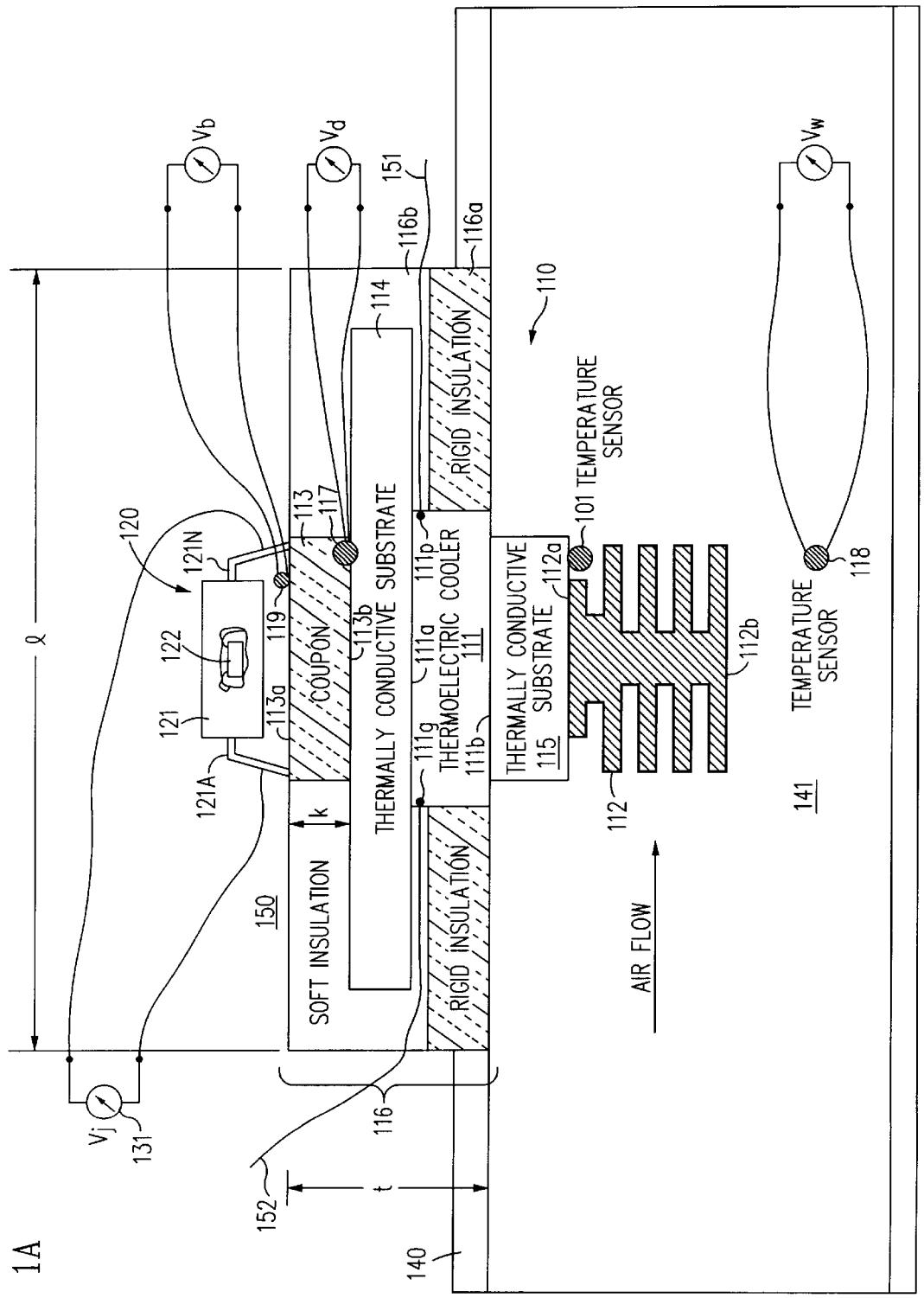
FIGS. 1A and 1B illustrate, in cross-sectional views, an apparatus including a test component attached to a board simulator during two calibration steps.

The temperature of a junction inside an electronic component is determined empirically according to the principles of this invention by measuring the thermal resistivity of a target board on which the electronic component is to be mounted, and using the measured thermal resistivity to lookup a set of calibration measurements of a board simulator. The board simulator (also called "power dissipation control structure" and "heatflow controller") is calibrated with a test component for various thermal resistivities, and while dissipating various amounts of power (including the predetermined amount of power).

In one embodiment, a board simulator 110 (FIG. 1) is attached to a test component 120 that is similar to a predetermined electronic component to be mounted on a target board. Board simulator 110 includes a thermoelectric cooler 111, a heatsink 112 and a coupon 113. Coupon 113 is formed of the same material as the target board. Alternatively, coupon 113 can be formed of a non-thermally conductive material so that heat flowing to coupon 113 can be determined from the temperatures at the coupon's two sides, a first side 113a and a second side 113b.

In this embodiment, coupon 113 has an area approximately equal to the footprint F (FIG. 2) of package 121, e.g. an area enclosed between terminals 121A–121N (FIG. 1A). Also in this embodiment, coupon 113 is formed of FR4 in accordance with a well known industry standard specification, EIA/JESD 51-3, "Low Thermal Conductivity Test Board For Leaded Surface Mount Packages" (see Table 1 below). Coupon 113 can be formed of Kovar in a second embodiment (see Table 2 below) or of aluminum in a third embodiment (see Table 3 below).

Test component 120 (described below) is mounted on first side 113a by e.g. soldering onto traces in the normal manner for the FR4 coupon, or by thermal grease for the kovar and aluminum coupons. Second side 113b of coupon 113 is thermally coupled to a first side 111a of thermoelectric cooler 111, for example, by a first thermally conductive substrate 114 that can be formed, for example, of diamond, or as a sandwich of diamond/kovar/diamond. A second side 111b of thermoelectric cooler 111 is thermally coupled to a first side 112a of a heatsink 112, for example, by a second thermally conductive substrate 115 that can be formed of, for example, diamond. A second side 112b of heatsink 112 is exposed to the ambient air in region 141 surrounding board simulator 110.

Thermoelectric cooler 111 is enveloped in insulation 116. Insulation 116 ensures that substantially all the heat received by coupon 113 from test component 120 flows through thermoelectric cooler 111 to heatsink 112. In this embodiment insulation 116 includes rigid insulation 116a and soft insulation 116b. Rigid insulation 116a is attached to thermoelectric cooler 111, and provides structural support needed to mount board simulator 110 in, for example, a wind tunnel 140. Soft insulation 116b can be put all around coupon 113, thermally conductive substrate 114 and thermoelectric cooler 111 such that soft insulation 116b does not go beyond a plane passing through the first side 113a of coupon 113, to insure that insulation 116 does not disturb flow patterns in region 150 adjacent to test component 120.

In this particular embodiment, a first thermocouple 117 is mounted on a surface 113b of coupon 113. First thermocouple 117 is thermally coupled by thermally conductive substrate 114 to a first side 111a of thermoelectric cooler 111. A second thermocouple 118 is suspended in the ambient air surrounding heatsink 112. Thermocouples 117 and 118 are respectively used to monitor voltages Vd and Vw, that correspond respectively to device temperature Td and coolant temperature Tw. The difference Td–Tw is indicative of the thermal resistance of board simulator 110.

Board simulator 110 has a thickness t of, e.g. 0.06 inch, a length l of, e.g. 4.5 inches and a width w (not shown) of, e.g. 3.25 inch. In three variants of this embodiment, coupon 113 is formed of a FR4 board, a kovar board, or an aluminum board, all available from Pycon, Inc., 3301 Leonard Court, Santa Clara, Calif. 95054.

Thermally conductive substrates 114 and 115 can be, for example, 0.6×0.6×0.008 inch diamond available from Norton Diamond Film, Goddard Road, Northboro, Mass. 01532. Thermoelectric cooler 111 can be a Peltier device, part number CP 1.0-71-08-L, available from MELCOR, Materials Electronic Products Corporation, 1040 Spruce Street, Trenton, N.J. 08648.

Rigid insulation 116a can be e.g. cardboard (made of wood pulp) of area 1 foot×1 foot and thickness ⅛ inch, while soft insolation 116b can be, e.g. plastic foam of area 6 inch×6 inch and thickness 0.5 inch both available from any hardware store, for example Orchard Supply Hardware, 720 W. San Carlos Street, San Jose, Calif. In another embodiment rigid insulation 116a and soft insulation 116b are encased in an aerogel (available from Aerogel Corporation) to form insulation 116. Insulation 116 can be formed of other materials such as fiber glass, cork, paper, plastic and vacuum in other embodiments.

Heatsink 112 can be, e.g. part number 2296B available from Thermalloy, Inc., 2021 West Valley View Lane, Dallas, Tex. 75234-8993. In one embodiment, all parts of board simulator 110 are attached by a thermal grease, such as THERMACOTE™ available from Thermacote, Inc., 2021 West View Lane, Dallas, Tex. 75234-8993. Thermocouples 117 and 118 can be, for example, part numbers EXPP-K-245 available from Omega Engineering, P.O. Box 2284, Stamford, Conn. 06906.

In one embodiment, thermally conductive substrate 114 (FIG. 1A) acts as an isothermal cold plate and is controlled by operation of thermoelectric cooler 111. Thermoelectric cooler 111 can be operated to cause first side 111a to be cooler than second side 111b (even in the absence of heatsink 112), or vice versa, depending on the electrical power supplied between a power terminal 111p and a ground terminal 111g of thermoelectric cooler 111. Power terminal 111p and ground terminal 111g are connected to electrically conductive wires 151 and 152 that pass through soft insulation 116b to thereby reduce heat loss through wires 151 and 152. The thermal power passing through board simulator 110 can be determined by measuring the amount of electric power supplied to thermoelectric cooler 111 and measuring the temperature difference Td–Tw, as indicated by the corresponding voltage difference Vd–Vw (FIG. 1A).

An optional thermocouple 119 mounted on a first side 113a of coupon 113 measures a board temperature Tb, as indicated by voltage Vb. Coupon 113 is formed of a material of a predetermined thermal conductivity and has a predetermined size. The thermal power passing through coupon 113 can be determined by the following formula:

$$Q = (KA/\kappa)(Tb-Td)$$

where K is thermal conductivity of coupon 113, A is the area of coupon 113 and κ is thickness of coupon 113. In one specific embodiment, area A of coupon 113 is at least as large as a footprint F (such as an area enclosed within terminals 121A–121N as illustrated in FIG. 2) of a predetermined component. In this embodiment, an additional thermocouple 101 (FIG. 1A) is mounted on first side 112a of heatsink 112, to determine the temperature at a point between thermoelectric cooler 111 and heatsink 112.

Figure 1B:
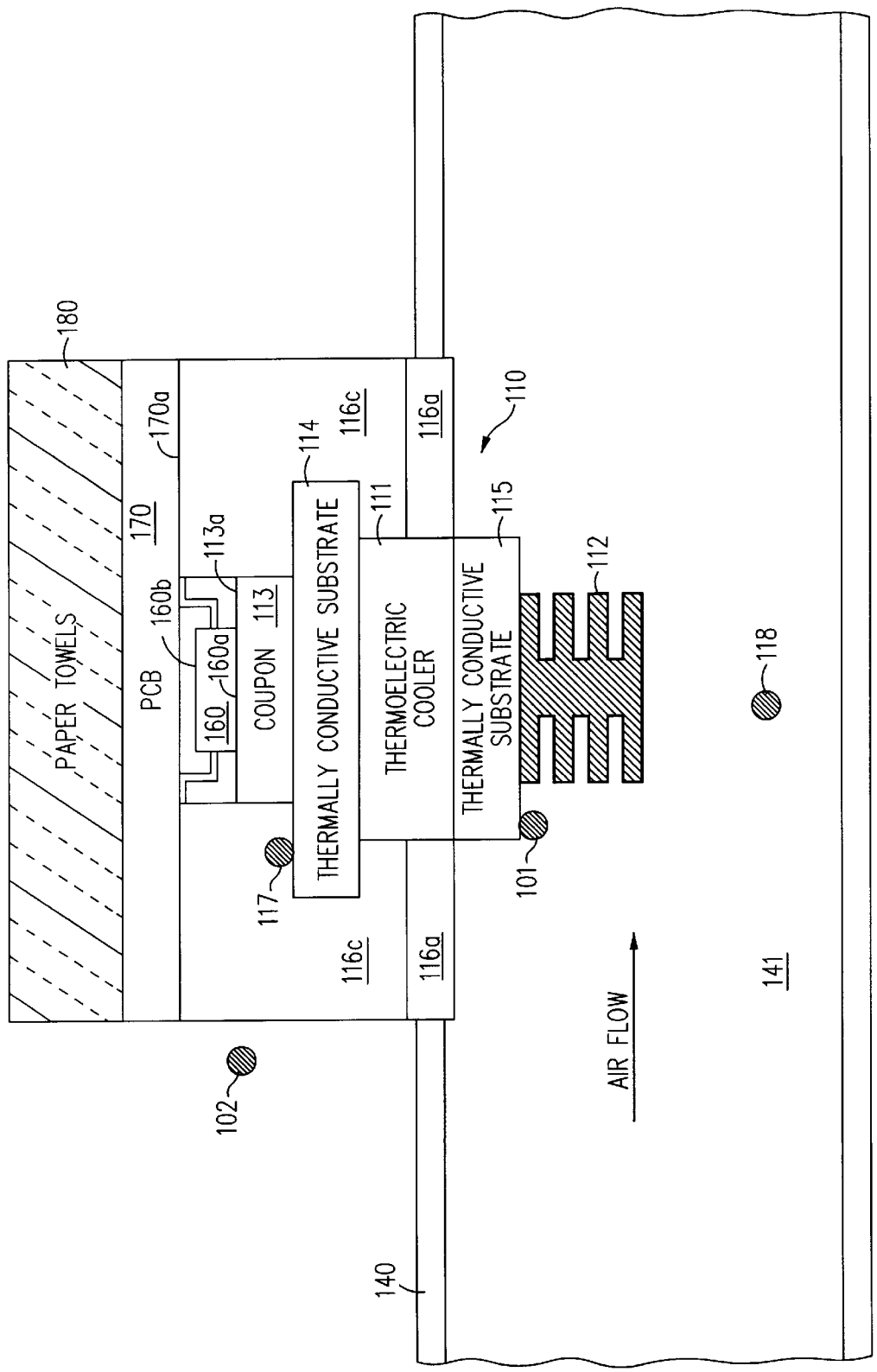
Figure 1C:
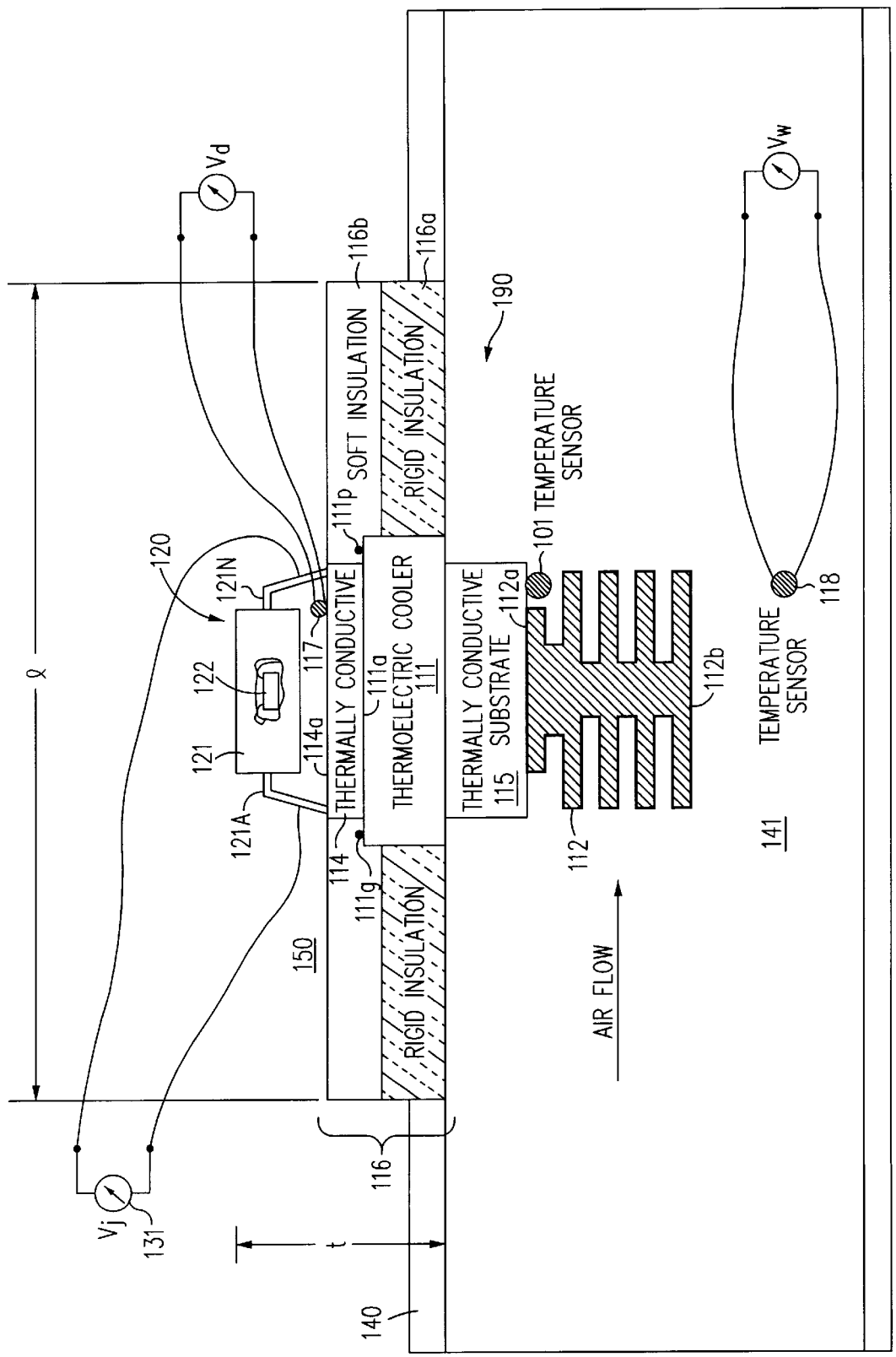
FIGS. 1C and 1D illustrate in an alternative embodiment, the apparatus of FIGS. 1A and 1B devoid of a coupon.
Figure 1D:
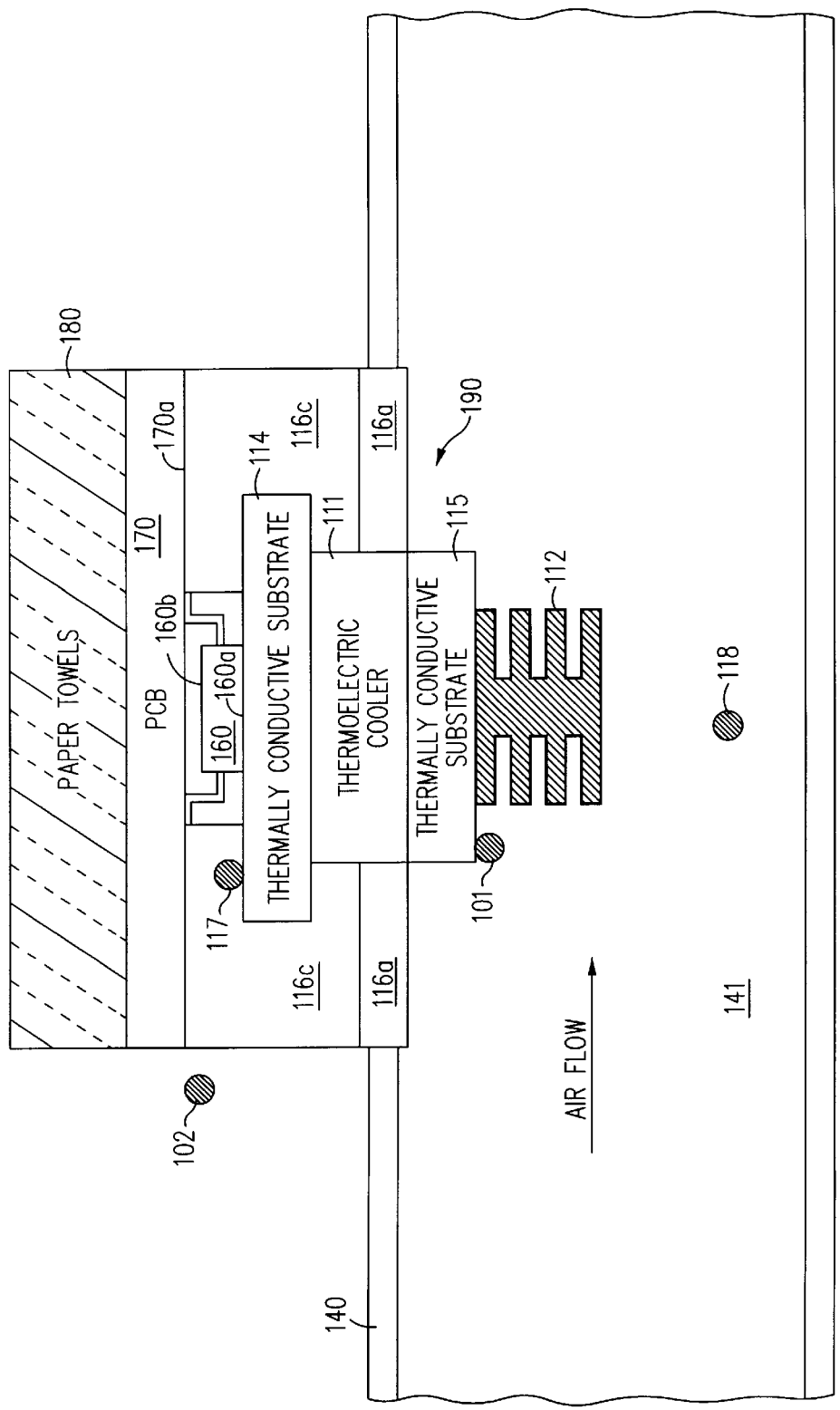

Board simulator 110 (FIG. 1A) can be calibrated as illustrated in FIG. 1B to obtain board simulator thermal resistivities for different bias power as illustrated by FIGS. 5A–5E. The same reference numerals are used to indicate identical components in FIGS. 1A–1D.

First side 113a (FIG. 1B) of coupon 113 of board simulator 110 is directly attached to first side 160a of electronic component 160 that is optionally mounted on printed circuit board (PCB) 170. Therefore, foam insulation 116c extends up to a first side 170a of PCB 170. First side 170a of PCB 170 faces a second side 160b of component 160. A number of paper towels 180 or other insulator, e.g. foam, is placed on PCB 170, for insulation to ensure that substantially all (90–95%) of heat from component 160 flows through coupon 113. PCB 170 contains circuitry used to supply power to control and monitor operation of electronic component 160. PCB 170 can be eliminated in other embodiments with paper towels 180 or other insulator placed directly on foam insulation 116C.

Returning to FIG. 1A, test component 120 of this specific embodiment includes a package 121 that is identical to the package of the electronic component to be operated by the user, e.g. component 160 (FIG. 1B). Package 121 (FIG. 1A) encloses an integrated circuit die 122 (hereinafter "thermal die" 122) that includes a heating element 123 (FIG. 2), such as, a resistor, and a temperature sensor 124, for example a diode bridge. A diode bridge can be formed as follows: anodes of two diodes D1 and D2 are connected to a terminal 125, the cathodes of diodes D1 and D2 are connected to two sensor terminals 126 and 127 respectively, and two resistors R1 and R2 are connected between the respective sensor terminals 126, 127 and terminal 128. The two terminals 126 and 127 can be coupled to a voltmeter 131 (FIG. 1A) that indicates a voltage Vj that corresponds to a junction temperature Tj on thermal die 122. Terminals 125 and 128 can be respectively coupled to a source of the power reference voltage VCC (not shown) and a source of the ground reference voltage GND (not shown).

Figure 10:
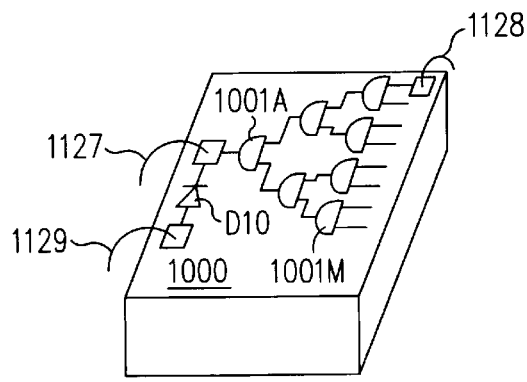
FIG. 10 illustrates a normal semiconductor die with a number of gates as the heating element and a diode as a temperature sensor for use as a test component in one embodiment.

Moreover, although temperature sensor 124 has been described above in terms of a diode bridge, other such junction temperature sensors can also be used. For example, a junction temperature sensor can be formed of a single diode D1 (FIG. 2) and a single resistor R1, without diode D2 and resistor R2. In such a junction temperature sensor, the temperature drop across diode D1 is measured after coupling terminal 128 to a source of the power reference voltage VCC and a terminal 125 to the source of the ground reference voltage GND. The voltage is measured at terminal 127, and the temperature rise in diode D1 is determined by comparison of the measured voltage with a diode drop versus temperature curve or from the formula $\Delta T = \Delta mv/k$ discussed below in reference to accuracy of measurement of junction temperature. Also, instead of a thermal die 122, an integrated circuit die (also called "normal die") 1000 (FIG. 10) having gates that act as the heating element, can be used, with a diode in the normal die used to determine the temperature rise.

In three variants of this embodiment, thermal die 122 is enclosed in three packages: a first (plastic quad-flat-pack, PQFP) package 310, a second (POWERQUAD2, a registered trademark of Amkor Electronics, Inc., 3945 Freedom Circle, Santa Clara, Calif. 95054) package 320 and a third (e.g. MQUAD, a registered trademark of Olin Corporation, 91 Shelton Avenue, New Haven, Conn. 06511) package 330 (see FIGS. 3A–3C). Packages 310, 320 and 330 have the respective package terminals 311A–311N, 321A–321N and 331A–331N, where N is the number of package terminals (e.g. N is 208). Packages 310, 320 and 330 are industry standard packages well-known to a person of skill in the art of packaging integrated circuit die. In one specific embodiment, thermal die 122 is a Symbios Logic "Temp09", available from Symbios Logic (Hyundai Electronics), 2001 Danfield Court, Fort Collins, Colo. 80525-2905.

Although in one embodiment, a board simulator 110 (FIGS. 1A and 1B) includes a coupon 113, in another embodiment, board simulator 190 (FIGS. 1C and 1D) is devoid of such a coupon, and electronic components 120 and 160 are mounted directly on the first thermally conductive substrate 114.

Once a test component 120 (FIG. 1A) or 160 (FIG. 1B) is mounted on board simulator 110, a known thermal power W (e.g. 0.1 watt to 0.5 watt) is generated by the heating element in test component 160, and temperatures Tj, Td and Tw are measured for different values of thermal resistivity of board simulator 110, as described below. During such measurement, also called "first calibration step", board simulator 110 simulates or models the target board (e.g. board 800) on which the electronic component (not shown) is to be operated.

Specifically, a model 400 (FIG. 4) illustrates the thermal resistivity of the apparatus of FIG. 1A. Model 400 includes thermal resistors Rc, Rt and Rp that are connected to each other in series. Thermal resistor Rc represents the thermal resistivity between a junction in a test component 120 (FIG. 1A) and ambient air in region 150. One end of thermal resistor Rc is at ambient temperature Ta, while the other end is at temperature Tj. Thermal resistor Rt represents thermal resistivity of test component 120, and has one end at temperature Tj and the other end at temperature Td. Finally, thermal resistor Rp represents thermal resistivity of board simulator 110, and has a first end at device temperature Td and a second end at coolant temperature Tw.

Thermal resistor Rt need not be determined to practice one embodiment of this invention. Instead, temperatures Td and Tj are measured empirically as discussed above, by use of board simulator 110 (FIG. 1A) and package 121 (FIG. 2) respectively. For example, a known thermal power, such as, 1 watt is supplied at a junction J between thermal resistors Rc and Rt by heating element 123 (FIG. 2). Thermal resistor Rt models heat lost through terminals 121A ... 121N (FIG. 1A) by conduction, while thermal resistor Rc models heat lost by package 121 (FIG. 1A) to air in region 150 by convection.

Model 400 (FIG. 4) also represents an electronic component mounted on a target board, where the thermal resistors Rc and Rt model the heat lost by the electronic component and thermal resistor Rp models heat transfer through the target board. According to the principles of the invention, the behavior of temperatures Td and Tw with respect to junction temperature Tj for different values of thermal resistivity (also called "temperature rise function" or "lambda") of board simulator 110 are used to estimate the junction temperature of an electronic component, if the thermal resistivity of the target board is known. Thermal resistivity of board simulator 110 is the difference in temperatures between thermocouples 117 and 118, divided by the thermal power passing through optional coupon 113 if present, thermal conductive substrate 114, thermoelectric cooler 111 and heatsink 112.

Board simulator 110 is calibrated in a first calibration step using the apparatus of FIG. 1B to determine an intrinsic thermal resistivity Rpi, for a given amount of power dissipation into the board simulator 110. Specifically, in the first calibration step, a difference in temperatures Td–Tw, indicated by thermocouples 117 and 118 is measured while a known thermal power W is dissipated through board simulator 110. If intrinsic resistivity Rpi=(Td–Tw)/W is higher than lambda of a target board, thermoelectric cooler 111 is operated forward biased to cool the second side 111b. Alternatively, if intrinsic resistivity Rpi is lower than lambda of a target board thermoelectric cooler 111 is operated reverse biased to heat the second side 111b. Such a calibration step is used to determine a range of temperature differences Td–Tw for different amounts of bias power W (also called peltier power) of thermoelectric cooler 111 (FIG. 1B), as illustrated in FIGS. 5A–5E. Specifically, FIGS. 5A–5E illustrate calibration graphs for five different known thermal powers, 0.1W, 0.2W, 0.3 W, 0.4 W and 0.5 W dissipated through board simulator 110 (FIG. 1B).

Figure 6A:
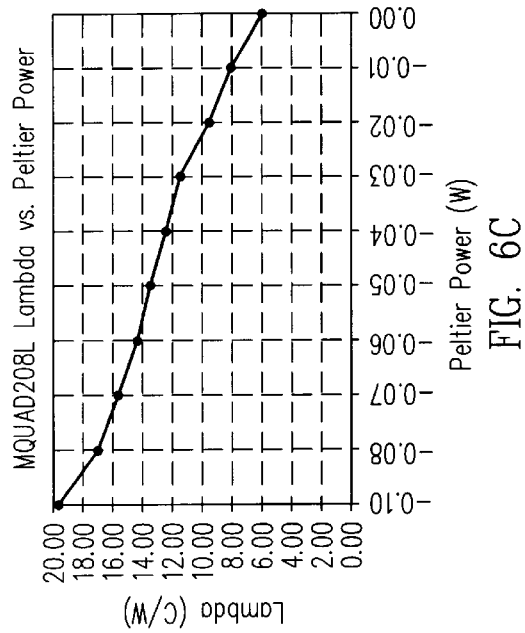
FIGS. 6A–6D illustrate calibration graphs showing thermal resistivity (also called "lambda") vs. bias power (also called "peltier power") for various packages.
Figure 6C:
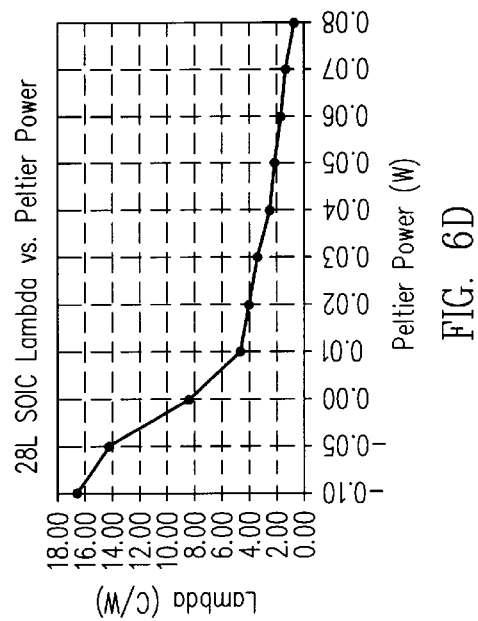
Figure 6B:
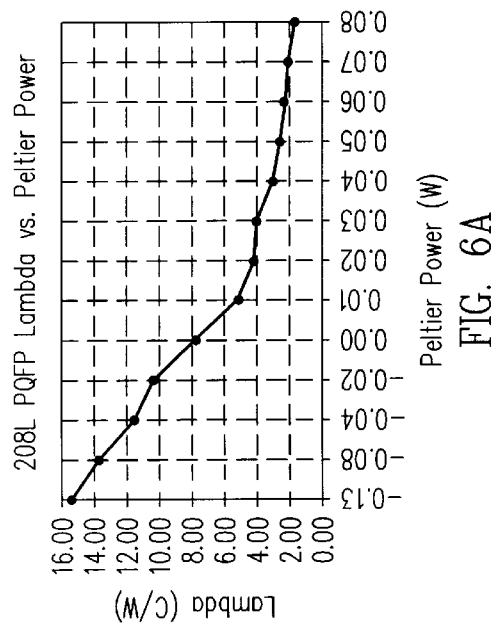
Figure 6D:
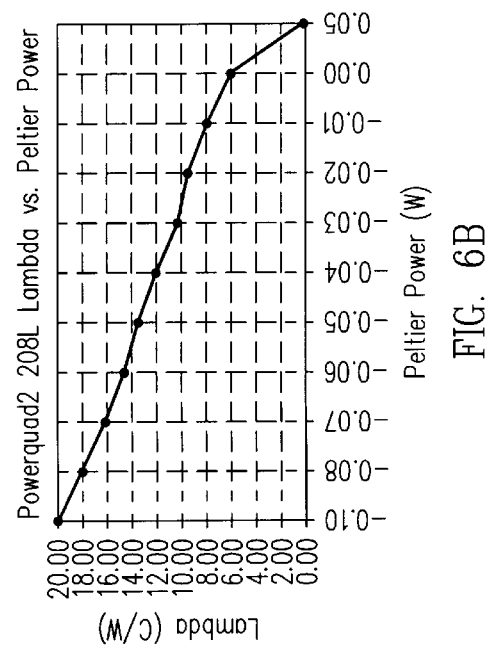
Figure 7C:
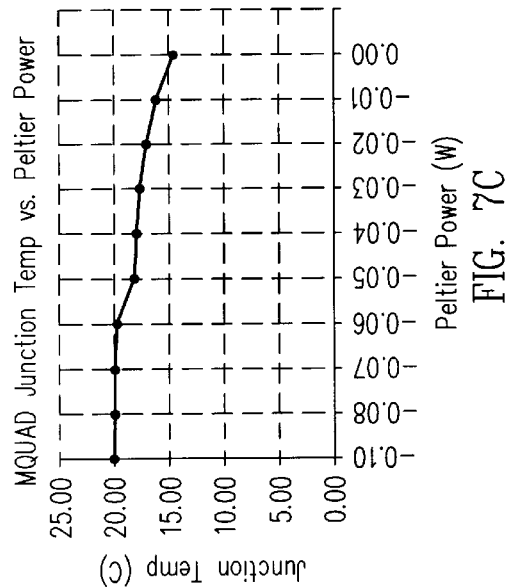
FIGS. 7A–7D illustrate measurement graphs showing junction temperature vs. peltier power for various packages.
Figure 7D:
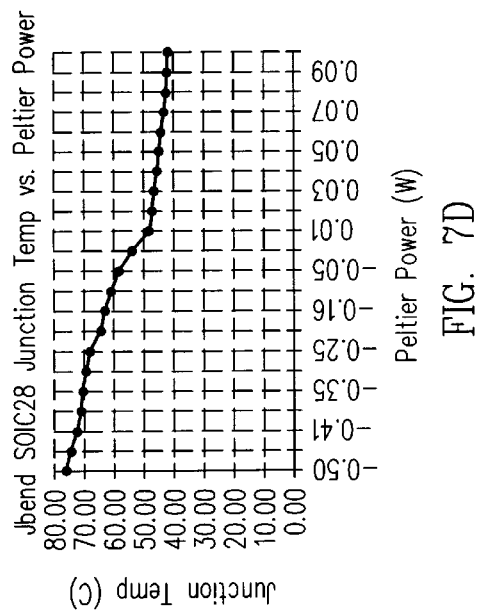
Figure 7A:
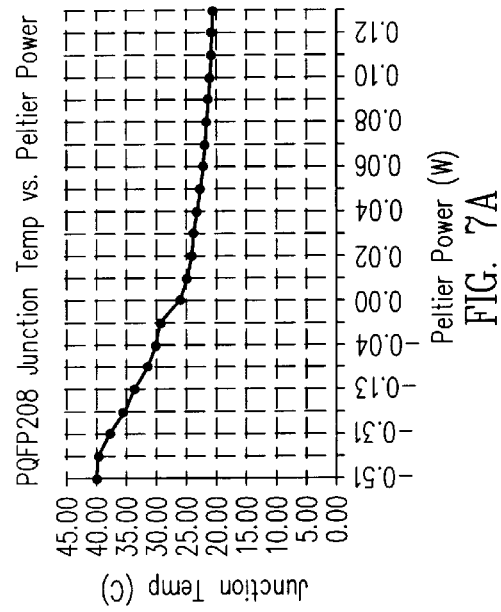
Figure 7B:
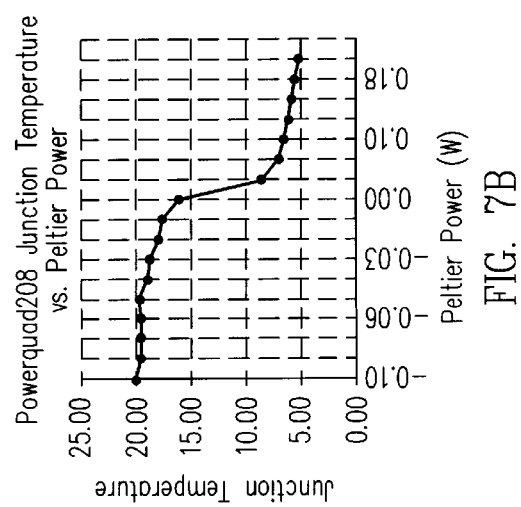

Next, in a second calibration step, board simulator 110 is used in the apparatus of FIG. 1A, and while a known thermal power is supplied to thermal die 122, junction temperature sensor 124 is used to measure a junction temperature. Also, temperature difference Td–Tw is measured as the difference in temperatures of thermocouples 117 and 118. Then, two graphs can be created as described below, one showing thermal resistivity of board simulator 110 versus bias power, and another showing the junction temperature versus bias power, as illustrated by the pairs of graphs FIGS. 6A, 7A, . . . , FIGS. 6D, 7D. FIGS. 6A–6C and 7A–7C illustrate calibration graphs for each of the packages in FIGS. 3A–3C. FIG. 6D and 7D illustrate a calibration graph for an industry standard package SOIC28 (not shown).

Figure 5A:
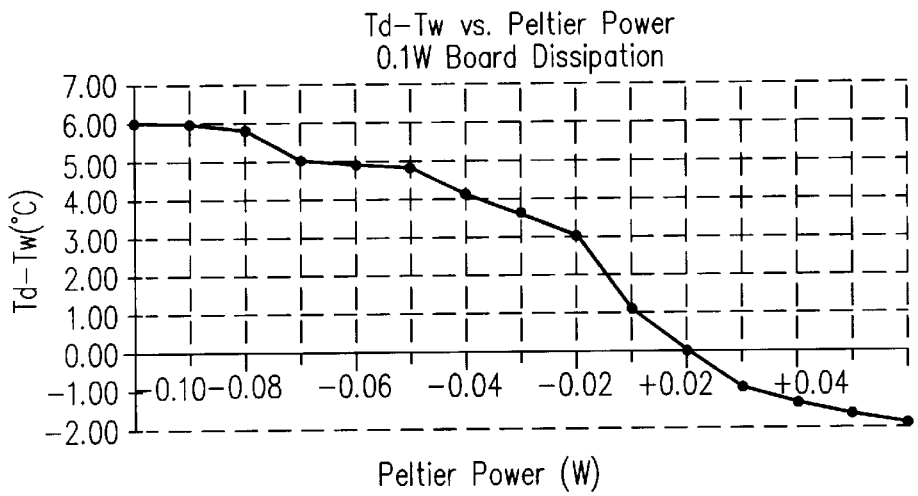
FIGS. 5A–5E illustrate temperature rise Td–Tw from dissipation of a predetermined power by component 160 (FIG. 1B) for different bias power supplied to thermoelectric cooler 111.
Figure 5B:
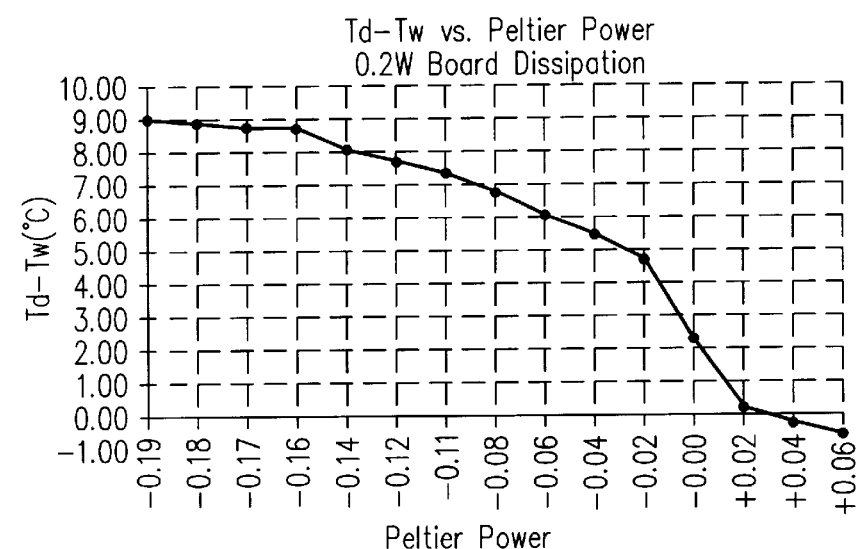
Figure 5C:
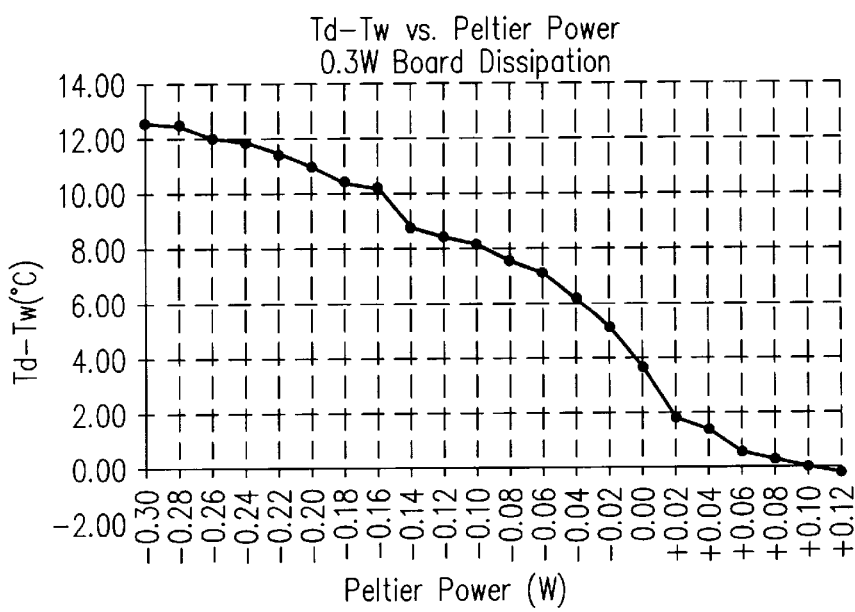
Figure 5D:
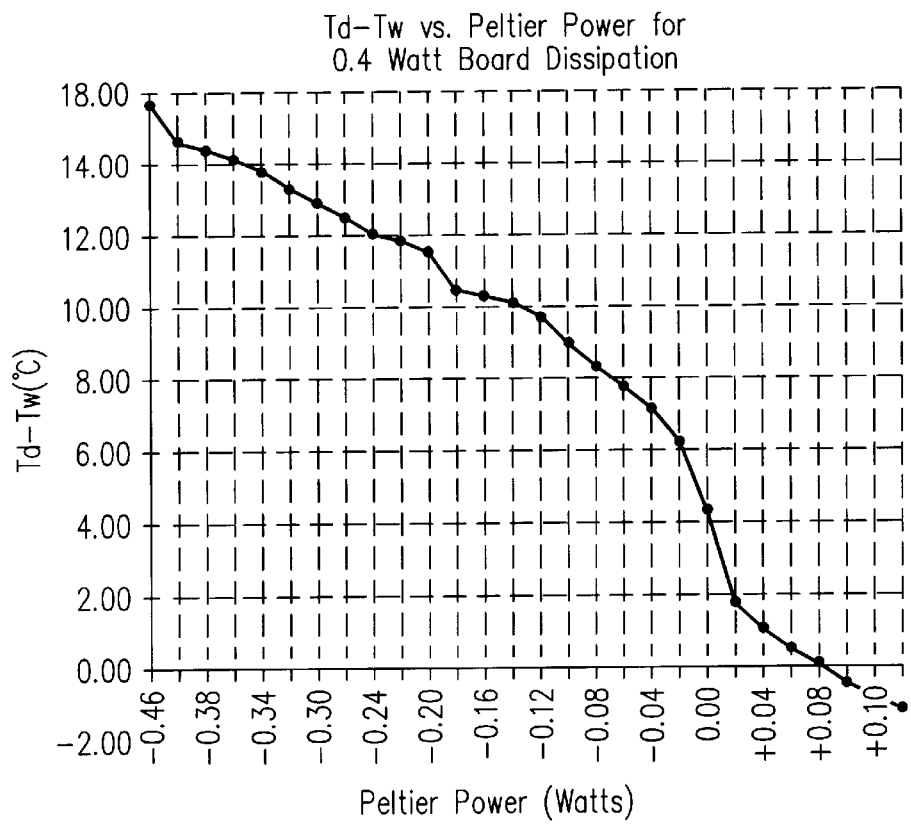
Figure 5E:
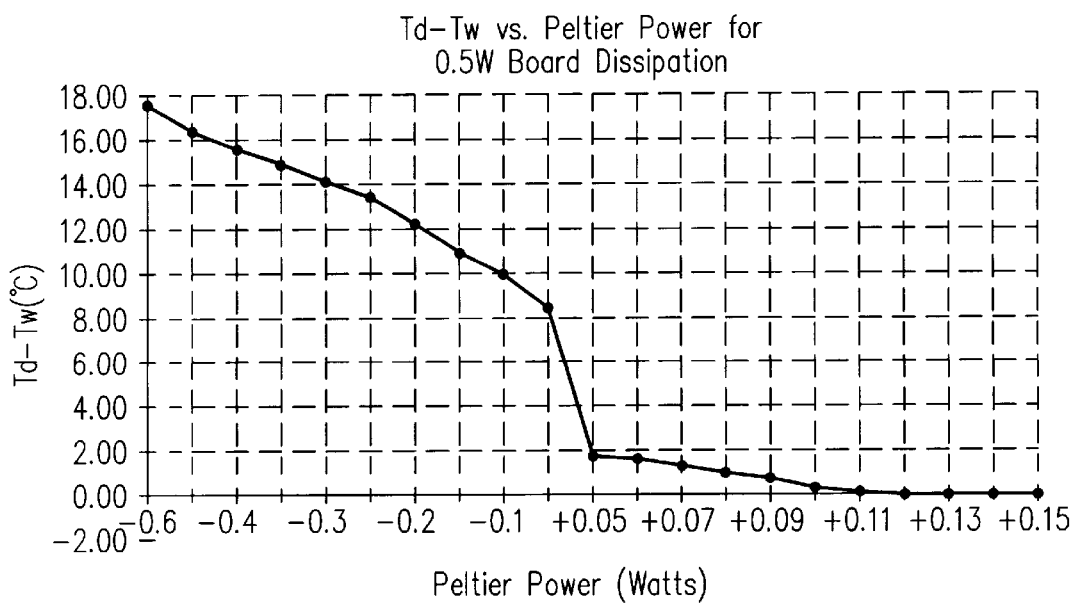

In calibration graphs FIGS. 6A–6D and 7A–7D, lambda denotes the temperature rise Td–Tw divided by the power Eb dissipated by heat flow controller 110 (FIG. 1B). The power Eb dissipated into board simulator 110 (FIG. 1A) and used to calculate lambda is determined from FIGS. 5A–5E by using the temperature rise Td–Tw and the bias power to find the appropriate graph. For example, if the temperature rise is 4° C. and the bias power is 0.02 watts, dissipated power Eb is seen from the first calibration graph to be 0.2 watts (FIG. 5B). In this example, lambda is 4/0.2=20. Similarly, for different values of temperature rise Td–Tw, the value of lambda is determined for a given amount of bias power. The different values of lambda can then be tabulated or plotted versus the bias power, as illustrated in FIGS. 6A–6D. The junction temperatures can also be tabulated or plotted versus the bias power, as illustrated in FIGS. 7A–7D.

The following formulae (with exemplary values of one embodiment) can be used to determine the error in using calibration graphs of the type illustrated in FIGS. 6A–6D and 7A–7D. Specifically, accuracy in measurements by heat flow controller (FIG. 4) can be calculated as follows:

$$p = \Delta T / E$$

$$dp = sqrt[dT(1/E)^2 + dE(T/E^2)^2]$$

Where,

E=VI, the power dissipated into board simulator

ΔT=Temperature difference (Td–Tw) across the simulator p=Temperature rise function that represents thermal resistivity of Resistor Rp (FIG. 4)

I=Current used to dissipate power E

V =Voltage used to dissipate power E $$dE = sqrt[dI(V)^2 + dV(I)^2]$$

In one example, I=0.289 A maximum, V=3.46 V maximum, ΔT=20 degrees Celsius maximum, dI=0.003 A, dV=0.0002 V, dΔT=1.1 degrees Celsius. Using the above formula, dp=2.2° C./W. Therefore, measurement of "p" can have a random error of ±2.2° C./W. So, to get the worst case "p", the user can add 2.2 to the test board's measured "p" value, prior to using calibration graphs FIGS. 6A–6D and 7A–7D. Similarly, accuracy of measurement of test board's temperature rise is db=2.2° C./W.

Figure 8A:
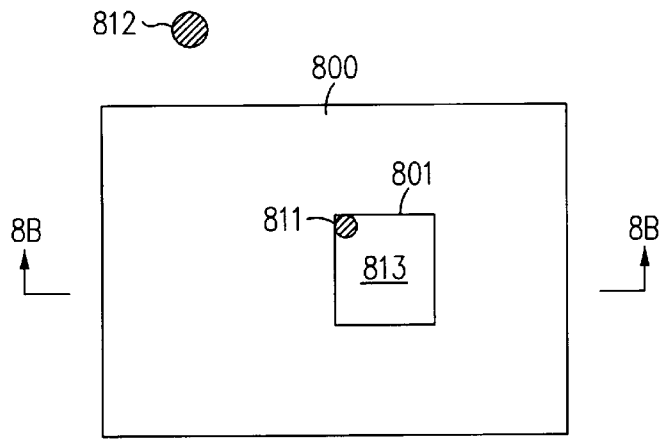
FIGS. 8A and 8B illustrate in plan and cross-section views respectively, the use of a heater wire to measure thermal performance of a target board.

Moreover, the difference between measurements of energy dissipated into target board 800 (FIG. 8A) and into heat flow controller 110 (FIG. 1A) can be calculated as follows:

$$Eb = \Delta T / \lambda$$

$$Eb = sqrt((1/\lambda)^2 * d\Delta T + (\Delta T/\lambda^2)^2 d\lambda)$$

where,

Eb=Power dissipated by leads 121A–121N (FIG. 1A) into board simulator 110

λ=Ideal temperature rise function (FIG. 4) for resistor Rp

ΔT=Ideal temperature rise Td–Tw of board at contact area (e.g. at thermocouple 117 in FIG. 1A)

Above formulae assume that all energy from heater wire 801 goes directly into target board 800 (e.g. Rc is infinite in FIG. 4 for target board 800), and that all energy from package 160 (FIG. 1B) goes through board simulator 110.

In one example, maximum λ=20 degrees Celsius W, maximum ΔT=15 degrees Celsius, and dλ=db+dp=2.2+2.2=4.4° C./W (error in measurement of resistivities of board simulator 110 and of target board 800). dΔT=1.1 degrees Celsius. Using above formula, d Eb=0.053 W.

Furthermore, accuracy of measurement of slope of diode bridge 124 (FIG. 2) can be calculated as follows:

$$k = \Delta mv / \Delta T$$

$$dk = sqrt((1/\Delta T)^2 * d\Delta mv + (\Delta mv/\Delta T2)^2 * d\Delta T)$$

where, k=Slope of diode drop used to measure temperature.

Δmv=Diode bridge voltage drop across terminals 126, 127

ΔT=Temperature drop for calibration

In one example, maximum Δmv=4.0 mV, maximum ΔT=20.0 degrees Celsius, d Δmv=0.00075mV, dΔT=1.1 degrees celsius.

Using the above formula, dk=0.011 mV/degrees celsius. Also, accuracy of measurement of junction temperature $$\Delta T = \Delta mv / k$$

$$d\Delta T = sqrt((1/k)^2 * d\, \Delta mv + (\Delta mv/k^2)^2 * dk)$$

where, k=Slope of diode drop used to measure temperature.

Δmv=Diode bridge voltage drop across terminals 126, 127

ΔT=Temperature rise of die junction J (FIG. 4)

In one example, maximum k=0.20 mV/degrees Celsius, dk=0.0106 mV/degrees Celsius, maximum Δmv=5.0 mV drop, dΔmV=0.00075mV. Using the above formula, dΔT= 0.137 degrees celsius Tables 1–3 below compare the empirically estimated junction temperatures to finite element estimates and to actual measurements.

TABLE 1

Low Conductivity Test Board at 1W in Still Air
λ = 13.8 C/W

| Singular Packages | Board simulator junction temperature rise ΔTj (est.) | Finite Element junction temperature rise ΔTj (est.) | Package on board junction temperature rise ΔTj (meas.) |
|---|---|---|---|
| 208L PQFP | 32 | 34 | 33 |
| 208L Powerquad | 19.6 | 19.5 | 20 |

TABLE 1-continued

Low Conductivity Test Board at 1W in Still Air
$\lambda = 13.8$ C/W

| Singular Packages | Board simulator junction temperature rise ΔTj (est.) | Finite Element junction temperature rise ΔTj (est.) | Package on board junction temperature rise ΔTj (meas.) |
|---|---|---|---|
| 208L MQUAD | 19.1 | 20 | 22 |
| 28L SOIC | 57.5 | 58 | 63 |

TABLE 2

Kovar test PCB at 1 Watt in Still Air $\lambda = 9.9$ C/W

| Singular Packages | Board simulator junction temperature rise ΔTj (est.) | Finite Element junction temperature rise ΔTj (est.) | Package on board junction temperature rise ΔTj (meas.) |
|---|---|---|---|
| 208L PQFP | 29 | 34 | 29.1 |
| 208L Powerquad | 19.6 | 20 | 19.6 |
| 208L MQUAD | 17.6 | 20.5 | 19.5 |
| 28L SOIC | 55 | 58 | 57.9 |

TABLE 3

Aluminum test PCB at 1W in Still Air $\lambda = 6.4$ C/W

| Singular Packages | Board emulator junction temperature rise ΔTj (est.) | Finite Element junction temperature rise ΔTj (est.) | Package on board junction temperature rise ΔTj (meas.) |
|---|---|---|---|
| 208L PQFP | 25 | na | 23.1 |
| 208L Powerquad | 16.3 | 12 | 13.9 |
| 208L MQUAD | 14.8 | 14 | 13.6 |
| 28L SOIC | 51.5 | na | 46.4 |

Thermal conductivities for boards of various materials are listed below in Table 4.

TABLE 4

| Material | Thermal Conductivity Watts/M-° K. |
|---|---|
| Diamond | 2,000 |
| Foam | 0.08 |
| FR4 (PCB) | 0.35 |
| Paper towels | 0.18 |
| Composite Plastic (IC packages) | 0.6 |
| Copper (e.g. package leads) | 200–400 |
| Copper slug (e.g. FIG. 3B) | 400 |
| Aluminum package (e.g. FIG. 3C) | 200 |
| Ceramic | 17 |
| Boron nitride | 1,500 |

A user can determine a target board's thermal resistivity (from heat conduction and convection) in a number of ways, for example by attaching an electronic component or test component 120 to a target board, and placing insulation over the attached component. Operation of the attached component can generate the known thermal power and thereby allow measurement of the temperatures Tb and Tz described below.

Figure 8B:
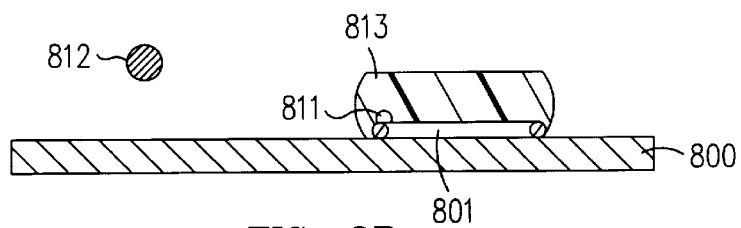
Figure 8C:
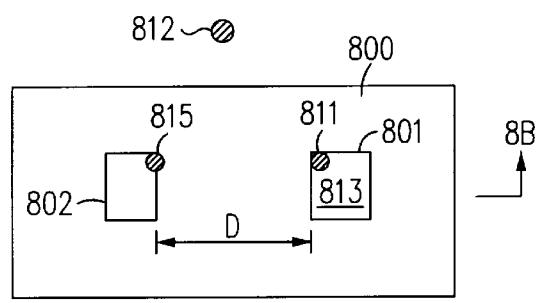
FIG. 8C illustrates measurement of temperature rise due to a neighboring electronic component.
Figure 8D:
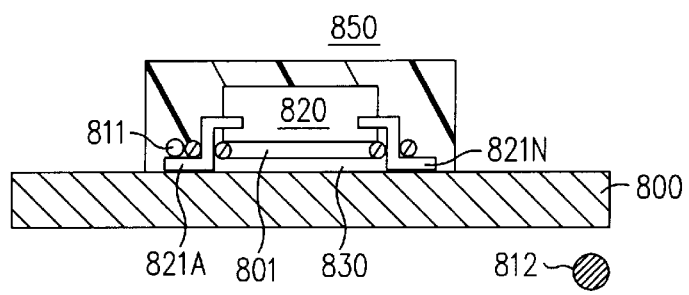
FIG. 8D illustrates an electronic component devoid of an integrated circuit die.

Alternatively, the user can also measure the thermal resistivity of a target board 800 (FIGS. 8A–8B) by mounting a heater element 801 formed of, for example nichrome (nickel 80% and chromium 20%) wire, in the same location as a predetermined location of a to-be-mounted package, thereby to contact target board 800 in a footprint area F (FIG. 2) enclosed by, for example, terminals 121A . . . 121N of package 121. A first thermocouple 811 is located in contact with heating element 801 to measure the temperature Tb of target board 800 in area F. A second thermocouple 812 is used to measure the ambient air temperature Tz (on either side of target board 800, as illustrated in FIGS. 8B and 8D in two embodiments). Insulation 813 is located on top of heating element 801 to thereby ensure that substantially all heat generated by heating element 801 passes through target board 800.

To perform a measurement, heating element 801 is operated, for example connected to a power supply (not shown), while the voltage and current of thermocouples 811 and 812 are monitored (by a multi-meter and analog-to-digital (A/D) board, both not shown). Use of a heater wire to determine the target board resistivity has the advantage of being very simple, and inexpensive. Instead of a nichrome wire, other types of heaters, such as thin ceramic resistors can also be used to measure a target board's thermal resistivity in the manner described above.

In addition to a heating element 811, such as a nichrome wire, a user can also use a dummy package 820 (FIG. 8D) (an electronic component devoid of an integrated circuit die), that is substantially similar (in one case identical) in mechanical specifications to the electronic component to be operated on the target board. In such a case, the user mounts heating element 801 indirectly on board 800, for example by attaching dummy package 820 to target board 800 and wrapping heating element 801 around terminals (e.g. leads) 821A–821N of dummy package 820. Heating element 801 is separated from board 800, e.g. by air gap 830. Heat from heating element 801 can be conducted by terminals 821A–821N to board 801 and can also be transferred by convection and radiation across gap 830. The user places insulation 840 around dummy package 820 and heating element 801 as illustrated in FIG. 8D to reduce heat loss to ambient air in region 850—thereby to ensure that a known amount of thermal power (i.e. the electric power supplied to heating element 801) passes through board 800.

A user determines lambda for a target board 800, by dividing temperature rise Tb–Tz (the difference between measurements by thermocouples 811 and 812) by the power W supplied to heating element 801. Then, the user can use the lambda to look up a bias power for a corresponding board simulator by using one of FIGS. 6A–6D. Thereafter, the user uses the determined bias power to look up the junction temperature from one of FIGS. 7A–7D.

Therefore, in one embodiment, insulation 813, heating element 801 and board 800 (FIG. 8A) mimic the corresponding paper towels 180, electronic component 160 and board simulator 110 (FIG. 1B). As an example, if the difference in temperatures of thermocouples 811 and 812 is 10° C., and if one watt of power is supplied to heating element 801, lambda=10° C./1 watt=10° C./watt. Then using FIG. 6A, peltier power is −0.02. Thereafter, using FIG. 7A, the junction temperature rise is approximately 28° C.

If there are two packages on a target board, the temperature rise of the target board at an adjacent location can be determined by sequential operation of heating elements 802 and 801. During operation of heating element 802 at a distance D (e.g. 0.1 inch; FIG. 8C), the temperature of thermocouple 811 is measured. The temperature rise at thermocouple 811, listed in Table 5A below, is added to the junction temperature rise ΔTj determined from operation of heating element 801 and subsequent use of the calibration graphs as described above.

TABLE 5A

Two packages on one target board
Powerquad D = 0.1" away from SOIC

| Packages | Temperature Rise of board due to heat from neighbor (A1 Board) (° C.) | Temperature Rise of board due to heat from neighbor (Kovar Board) (° C.) |
|---|---|---|
| 208L Powerquad | 1.5 | 2.7 |
| 28L SOIC | 2 | 2.4 |

As shown in Table 5B, use of a board simulator results in an empirically estimated junction temperature within 90% of the measured junction temperature.

TABLE 5B

| Neighboring Packages | Board simulator junction temperature rise ΔTj (est.) | Package on board junction temperature rise ΔTj (meas.) |
|---|---|---|
| Kovar test PCB at 1 Watt in Still Air l-9.9 C/W | | |
| 208L Powerquad | 21.3 | 23.4 |
| 28L SOIC | 57.4 | 62.6 |
| Aluminum test PCB at 1 W in Still Air λ = 6.4 C/W | | |
| 208L Powerquad | 17.8 | 15.8 |
| 28L SOIC | 53.5 | 46.5 |

Alternatively, during operation of heating element 802, the heating element 801 is also operated simultaneously, and as described above the thermal resistivity of board 800 at a location underneath heating element 801 is determined, followed by use of calibration graphs to determine the junction temperature rise at the location.

Figure 9A:
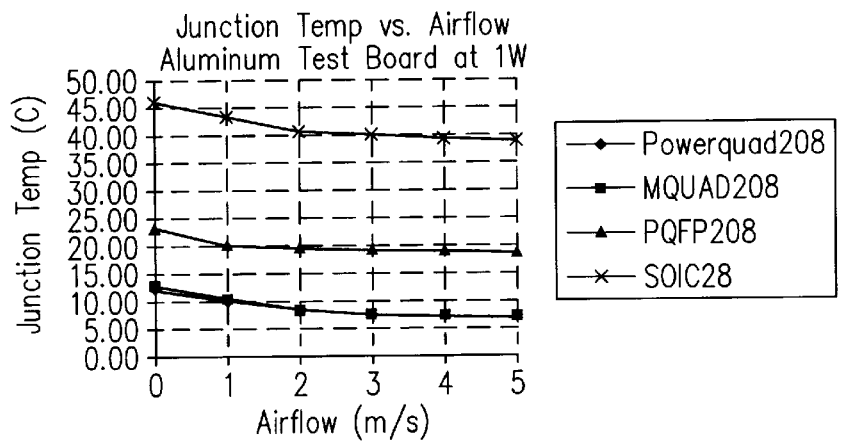
FIGS. 9A–9C illustrate graphs of junction temperature Tj as a function of air flow rate for the apparatus of FIG. 1A for various target boards: aluminum, kovar and low conductivity (FR4) printed circuit boards.
Figure 9B:
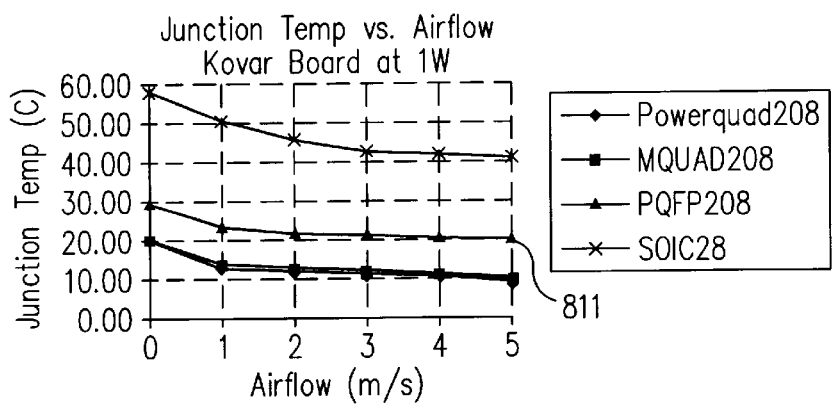
Figure 9C:
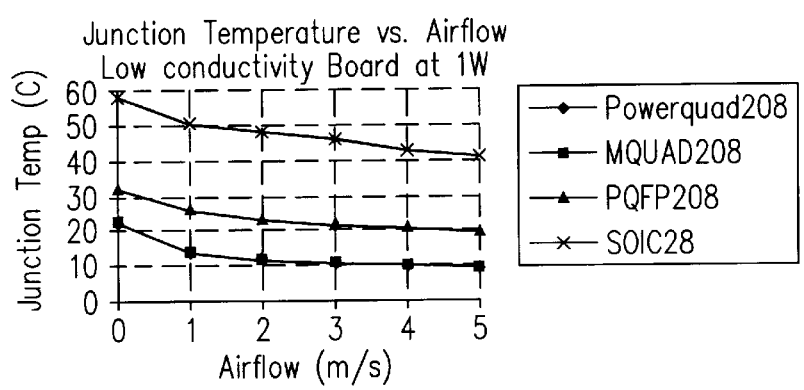

In the above analysis, airflow across test component 120 (in region 150) is not considered i.e. still air was used. However, a user can use FIGS. 9A–9C to determine the junction temperature in air flow at a predetermined rate, assuming that lambda of board/simulator 110 is the same as lambda of the target board in airflow at the predetermined rate. For example, if the junction temperature Tj in still air for a PQFP package is empirically estimated to be 30° C. by the above method, and the target board is made of kovar then the junction temperature with an air flow of 5 meters/second is seen to be 20° C. (see point 911 in FIG. 9B). Graphs in FIG. 9A–9C are obtained by measurements of junction temperature Tj in the apparatus of FIG. 1A, for different amounts of air flow across a target board of size 3.3"×4.5"× 0.06." Similar graphs can be made for target boards of different sizes and for other thermal powers.

In one embodiment of a board simulator that includes a coupon, such as coupon 113 (FIG. 1A), the coupon is preferably formed, as far as possible, of the same dimensions and the same materials as a target board. For example if a target board includes a layer of polyimide formed on an aluminum board, the coupon has a layer of polyimide or, alternatively, electrically insulating paint of the same dimensions and thermal conductivity as the polyimide. The aluminum board included in the coupon preferably also has the same dimensions and thermal conductivity as the aluminum board included in the target board. Proper design of coupon 113 can be critical because, for example, electrically insulating paint when used on kovar and aluminum boards decreases the thermal performance of these boards, in dependence on the paint's thickness. For example, in one embodiment a 0.008 inch layer of electrically insulating paint on a 0.06 inch thick aluminum board caused a 70° Celsius rise in temperature Td.

Numerous modifications and adaptations of the embodiments described herein would be obvious to a person of skill in the art of mechanical engineering, in view of the enclosed disclosure. For example, instead of using a test component 120 (FIG. 1A), a normal die 1000 (FIG. 10) (such as a microprocessor, e.g., Intel 80486) can be used, with the heat being generated by, for example, gates 1001A–1001M (not all M gates are labeled) in the normal die 1000, and the temperature being measured by the voltage drop across terminals 1127 and 1129 of a diode D10 (e.g. as described above). Hence an electronic component can be itself used instead of a test component, thereby eliminating the need to design and build the test component.

Also, thermal resistivity between an electronic component's junction and the board on which the electronic component is mounted can be determined easily, for example as Rt=(Tj–Td)/W, where W is the thermal power passing through the leads 121A–121N. The junction to board thermal resistivity (of resistor Rt) can be used in various models of thermal performance of an electronic component mounted on a target board, as will be obvious to a person of skill in the art of mechanical engineering in view of the enclosed disclosure.

Moreover, a coupon can be formed of any material (such as aluminum) of known thermal conductivity, so that heat flowing through the coupon can be determined from temperatures measured at the coupon's two sides through which the heat flows. Furthermore, any number of integrated circuit die can be enclosed in an electronic component to be operated on the target board.

Various such modifications and adaptations of the invention are included in the attached claims.

I claim:

1. A method for determining a thermal parameter of a device mounted on a substrate, said method comprising:

joining said device to said substrate;

operating said device to generate at least a predetermined thermal power;

ascertaining at least a thermal resistivity of said substrate by use of a temperature of said substrate and ambient temperature, at least a portion of said predetermined thermal power causing said substrate to be at said temperature; and using said thermal resistivity to determine at least said thermal parameter.

2. The method of claim 1 wherein said device includes a test component, and said substrate includes a board simulator, wherein:

said thermal parameter is a temperature inside said test component;

said joining includes attaching said test component to said board simulator, said test component having a second package identical to a first package of an electronic component mounted on a target board;

said ascertaining includes empirically determining a plurality of thermal resistivities of said board simulator and a corresponding plurality of temperatures in said test component for different values of thermal power generated in said test component; and said using includes interpolating to determine said temperature from said pluralities of thermal resistivities and said corresponding pluralities of temperatures by use of a thermal resistivity of said target board.

3. The method of claim 2 wherein said empirically determining comprises:

measuring a first temperature on a first side of said board simulator adjacent said test component and measuring a second temperature on a second side of said board simulator.

4. The method of claim 2 wherein:

said pluralities of thermal resistivities and said corresponding pluralities of temperatures are related by a graph.

5. The method of claim 2 wherein:

said pluralities of thermal resistivities and said corresponding pluralities of temperatures are related by at least one of a graph, a table and a formula.

6. The method of claim 1 wherein said device includes a heating element and said substrate includes a target board, wherein:

said joining includes at least mounting said heating element on a first side of said target board; and said ascertaining includes determining the difference between a temperature of said substrate and said ambient temperature and calculating said thermal resistivity of said target board by dividing said difference by said predetermined thermal power.

7. The method of claim 6 wherein said mounting comprises mounting a plurality of heating elements on said first side, and further wherein said operating comprises operating each heating element in said plurality of heating elements.

8. The method of claim 7 wherein said operating comprises sequentially operating each heating element in said plurality of heating elements.

9. The method of claim 7 wherein said operating comprises simultaneously operating each heating element in said plurality of heating elements.

10. The method of claim 6 wherein said mounting comprises attaching said heating element directly to said target board.

11. The method of claim 6 wherein said mounting comprises wrapping said heating element around terminals of an electronic component and mounting said electronic component on said target board.

12. The method of claim 6 wherein said mounting comprises mounting said device.

13. The method of claim 12 wherein said heating element is formed as a resistor in a semiconductor die and said semiconductor die is included in said device.

14. The method of claim 12 wherein said heating element is formed as a plurality of gates in said semiconductor die.

15. The method of claim 1 wherein:

said thermal parameter is a temperature inside said device; and said using includes using a prior calibration of said thermal resistivity against said temperature.

16. The method of claim 1 wherein:

said thermal parameter is energy transferred by said device.

17. The method of claim 1 wherein:

said device includes an electronic component having mounted therein an integrated circuit die; and said thermal parameter is a junction to board thermal resistivity of said integrated circuit die.

* * * * *